3,434,386
ADJUSTABLE RADIUS ATTACHMENT
William A. Hobbs, R.R. 1, Daleville, Ind. 47334
Filed Mar. 20, 1967, Ser. No. 624,418
Int. Cl. B23d 3/02
U.S. Cl. 90—24.3          10 Claims

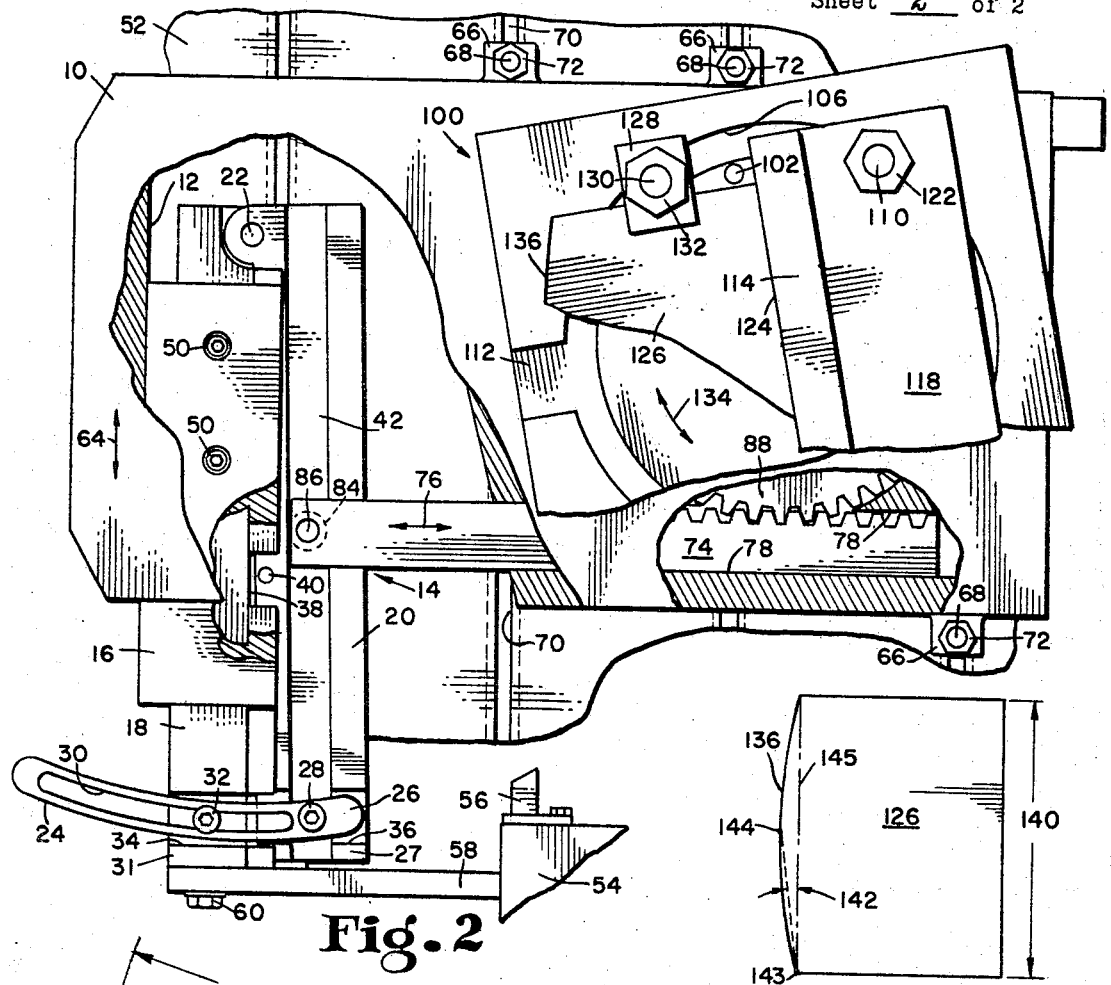
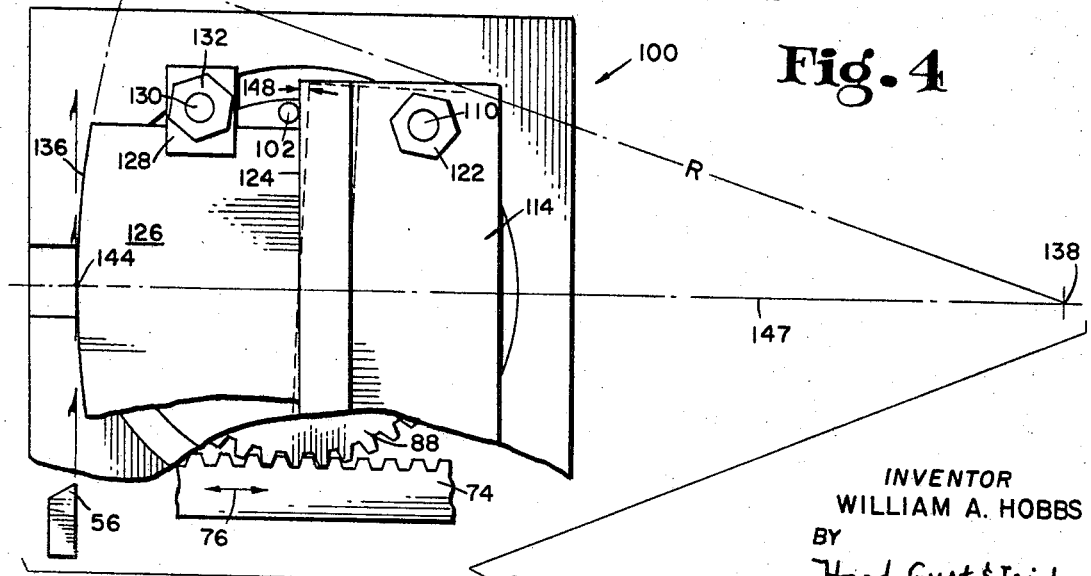
Fig. 2
Fig. 4
Fig. 3
INVENTOR
WILLIAM A. HOBBS
BY
Hood, Gust & Irish
ATTORNEYS

# United States Patent Office 3,434,386
Patented Mar. 25, 1969

ABSTRACT OF THE DISCLOSURE

A radius attachment for a machine of the type having relative, rectilinear reciprocation between its bed and cutting tool, the attachment comprising an assembly rigidly connected to said cutting tool and movable therewith, a rack arranged for transverse reciprocation at a selective rate in response to reciprocation of the assembly, a spur gear mounted on an axis fixed relative to the machine bed and drivingly engaged with the rack, and a work platform mounted for oscillation about a common axis with the spur gear and means for drivingly connecting the spur gear to the work platform.

---

My invention relates generally to adjustable radius attachments, and more particularly to an adjustable radius attachment for a machine of the type having relative, rectilinear reciprocation between its bed and cutting tool. A shaper having a stationary bed and a ram-mounted cutting tool and a milling machine having a stationary, rotary cutting tool and a reciprocably movable bed fall within the general category of the type of machine with which my invention may be used.

It is well known in the machining arts that it is difficult to cut a radius and, in fact, radiused cuts are usually made on a shaper by incrementally advancing the bed both laterally and vertically. Such an operation, obviously, requires a great deal of care and attention by the operator and, after the shaper operation is finished, smoothing of the cut thereby obtained with a file is common practice. A radiused cut is made on a milling machine in substantially the same manner, the only difference being that, when a milling machine is used, the work is moved past the cutting tool and, when a shaper is used, the cutting tool is moved past the work.

The apparatus of the present invention makes use of the relative, rectilinear reciprocation between the bed and cutting tool to oscillate the work platform about an axis stationary relative to the bed. Since the work platform and the work mounted thereon is oscillated about an axis at the same time that the cutting tool is engaging the work, a radiused cut is provided. The radius of the cut depends, of course, on the amount of oscillation of the work during the period when the cutting tool is engaged therewith.

The attachment of the present invention is ideally suited for cutting the rather large radii required for sheet metal-forming dies.

It is a primary object of the present invention, therefore, to provide an adjustable radius attachment for use in combination with a machine of the type having relative, rectilinear reciprocation between its bed and cutting tool.

Another object of the present invention is to provide such an apparatus including means for controllably oscillating the work about an axis fixed relative to the bed of the machine while there is relative reciprocation between the bed and cutting tool.

A further object of the present invention is to provide such an apparatus including means for positioning the work thereon so as to provide a predetermined center for the radiused cut.

Other objects and features of the present invention will become apparent as this description progresses.

To the accomplishment of the above and related objects, the present invention may be embodied in the form illustrated in the accompanying drawings, attention being called to the fact, however, that the drawings are illustrative only, and that changes may be made in the specific construction illustrated and described, so long as the scope of the appended claims is not violated.

In the drawings:

FIG. 2 is a top view, partially sectioned, of the attachment mounted on a shaper, only portions of which are shown;

FIG. 3 is a somewhat diagrammatic view showing a method for prepositioning the work on the work platform so as to define the center of the radiused cut to be obtained; and FIG. 4 is a diagrammatic view illustrating the curvature of the work piece shown in FIGS. 2 and 3.

Figure 1:
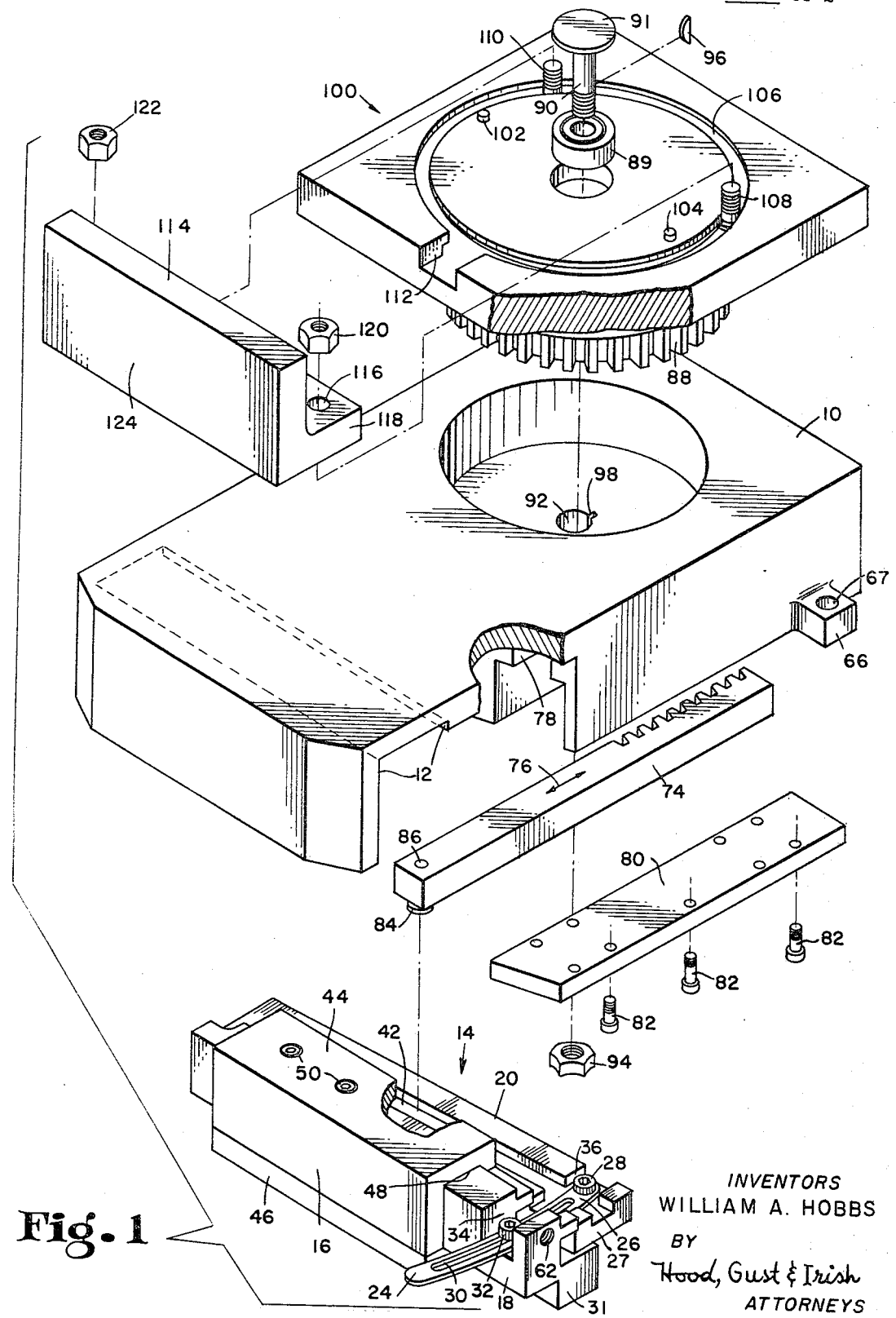
FIG. 1 is an exploded perspective view of the attachment of my invention.

The apparatus of my invention finds primary utility in the milling or shaping of bodies, and it has been illustrated, and will be described in that environment. It will be clear, however, that such an apparatus will find substantial utility in other applications, and that, as to such apparatus, the following description is intended to be illustrative and not limitative. For instance, the apparatus of the present invention is ideally suited for generating large radii on checking templates or the like. Thus, in the broadest form of the present invention, reference to a tool includes any means for forming, cutting, marking, measuring, etc.

Referring more specifically to the drawings, it can be seen that I have provided a base 10 having a guideway 12 formed therein and an assembly 14 adapted for reciprocation in the guideway 12. The assembly 14 comprises a slide block 16 which is guidingly received in the guideway 12 and which carries a sine-bar assembly comprising a first bar 18 which is stationary with respect to the slide block 16 and a second bar 20 which is pivotally mounted on the first bar 18 so as to be pivotally movable relative to the first bar 18 about the point 22. As viewed in FIG. 2, it can be seen that I have provided a sector bar 24 which is pivotally fastened at its right-hand end 26 to the end 27 of the second bar 20 by a screw 28. The sector bar 24 is provided with an arcuate slot 30 which is disposed over the end portion 31 of the first bar 18, as shown in FIG. 2. A screw 32 which extends through the arcuate slot 30 and threads into the first bar 18 is provided for clamping the sector bar 24 to the first bar 18, thereby adjustably fixing the position of the second bar 20 relative to the first bar 18.

In the illustrative form of my invention, the sector bar 24 is received in cut-outs 34 and 36 in the first bar 18 and second bar 20, respectively. The second bar 20 is accurately positioned relative to the first bar 18 by the usual sine-bar techniques normally employed in tool rooms and machine shops. Specifically, gauge blocks (not shown) are placed between the gauge surface 38 of the first bar 18 and the cylindrical pin 40 which is rigidly fastened to the second bar 20, the pin 40 being exactly parallel with the pivot axis 22. As is common practice, the surface 38 defines a plane which includes the pivot axis 22. Since the dimension between the pivot axis 22 and the pin 40 can be accurately defined, the exact angle between the second bar 20 and the first bar 18 can be established by placing gauge blocks having known thicknesses between the pin 40 and the surface 38. In the preferred form of my invention, the second bar 20 is exactly parallel with the first bar 18 when the pin 40 is against the surface 38.

A rectilinear, longitudinally extending slot 42 is provided in the second bar 20 as shown in FIGS. 1 and 2. The slot 42 is preferably exactly parallel with the second bar 20 so that, when the second bar 20 is displaced a predetermined angle from the first bar 18, the slot 42 will be displaced at the same angle from the first bar 18. The purpose of the slot 42 will be discussed further along in this specification.

In the illustrative form of my invention, the slide block 16 which carries the first bar 18 and second bar 20 comprises an upper block 44 and a lower block 46. The upper block 44 is provided with a longitudinally extending cut-out 48 which receives the first bar 18. The first bar 18 is held in the cut-out 48 by the lower block 46 which is rigidly fastened to the upper block 44 by means of screws, not shown. Set screws 50, the heads of which are either flush with or below the top surface of the block 44, are provided for holding the first bar 18 rigidly with respect to the upper block 44. The width of the upper block 44 is such that the block is guidingly received in the guideway 12. The assembly 14 is held in the guideway 12 because the bottom surface of the lower block 46 rides on the top surface of the machine bed, indicated by the reference number 52 in FIG. 2, upon which the attachment is mounted. Of course, a plate member, not shown, could be mounted on the base 10 so as to hold the assembly 14 in the guideway 12.

The assembly 14 is drivingly connected to the ram 54, partially shown, which carries the cutting tool 56 by the rigid arm 58 extending out from the left of the ram 54, as viewed in FIG. 2. The arm 58 is fastened to the end 31 of the first bar 18 by a screw 60 which extends through an aperture in the arm 58 and which threads into the threaded hole 62 provided in the end portion 31 of the first bar 18.

Thus, from the above description, it can be seen that the assembly 14, ram 54 and cutting tool 56 are all reciprocated in the direction of the arrow 64 relative to the base 10 and the bed 52.

Means are provided for securely fastening the base 10 to the machine bed 52. In the illustrative embodiment of my invention, the base 10 is provided with a plurality of toe brackets 66, each having a hole 67, shown in FIG. 1, which is in registry with one of the T-slots 70 formed in the bed 52 and which receives a T-bolt 68 of the usual type which is slidingly carried in the T-slots 70. A nut 72 is threaded on each T-bolt 68 tightly to secure the toe brackets 66 to the machine bed 52.

A rack 74 is arranged for reciprocation in the base 10 in the direction of the arrow 76 which, in the preferred form of my invention, is substantially perpendicular to the direction of the arrow 64. Specifically, the rack 74 is reciprocably disposed in the guideway 78 provided in the base 10 and is held in the guideway by a plate member 80 which is secured to the underneath side of the base 10 by means of the screws 82.

The rack 74 is drivingly engaged with the assembly 14 so that, when the assembly 14 is reciprocated in the direction of the arrow 64, the rack 74 is reciprocated in the direction of the arrow 76. Specifically, the rack 74 carries at its left end, as viewed in FIG. 2, a roller 84 which is guidingly received in the slot 42. The roller 84, which is an illustrative follower means, is journalled on a shaft 86 extending through the rack 74. The stroke of the rack 74 is determined by the angle between the second bar 20 and the first bar 18. Thus, if the second bar 20 and the slot 42 therein are parallel with the first bar 18 which is parallel with the direction of the arrow 64, the rack 74 will not reciprocate when the assembly 14 is reciprocated. On the other hand, if there is an angle between the second bar 20 and the first bar 18, the rack 74 will be reciprocated by the wedge-action of the slot 42 against the roller 84 which is journalled on the rack 74. In effect, therefore, the assembly 14 is a wedge for reciprocating the rack 74, the angle of the wedge being adjustable to control the stroke of the rack 74.

The rack 74 is drivingly engaged with a spur gear 88 which is journalled on the base 10. In the illustrative embodiment of my invention, the spur gear 88 is carried by a Timken bearing 89 which is journaled on a post 90 which extends through a hole 92 in the base 10. The post 90, which has a flat, enlarged head 91, is secured against rotation by a key 96 which is received in a keyway 98 in the base 10 and a similar key-way, not shown, in the post 90. A nut 94 is provided for holding the post 90 against axial, upward movement in the hole 92. From the above description, it can be seen that reciprocation of the rack 74 will result in oscillation of the spur gear 88 about the axis of the post 90, which is stationary relative to the base 10 and the machine bed 52. Of course, the degree of oscillation of the spur gear 88 is determined by the stroke of the rack 74 which is, in turn, determined by the angle between the slot 42 and the direction of the arrow 64.

I have provided a work platform, indicated generally by the reference number 100, which is mounted on the spur gear 88 so as to oscillate therewith. In the illustrative embodiment, the work platform 100 is journalled on the post 90 by means of the Timken bearing 89 and is secured against axial movement on the post 90 by the enlarged head 91. The work platform 100 may be connected to the spur gear 88 so as to oscillate therewith by any number of well known means. For instance, the dowel pins 102 and 104, which are used to align the work on the work platform, may also be used to pin the work platform 100 to the spur gear 88.

In a preferred form of my invention, the work platform 100 is provided with a circular T-slot 106 which is concentrically disposed relative to the post 90 and which receives T-bolts 108 and 110 through the opening indicated at 112. A backing member 114 is mounted on the work platform 100 and secured thereto by the T-bolts 108 and 110 which extend through apertures 116 in the horizontal flange portion 118 of the backing member 114. Nuts 120 and 122 threadedly receive the T-bolts 108 and 110, respectively, and are the means for tightly securing the backing member 114 to the work platform 100.

The backing member 114 is provided with a work engaging surface 124 which defines a plane including the axis of the post 90 when the backing member is placed in its preferred position on the work platform 100. The reason for so placing the work engaging surface will become apparent as this description progresses.

A work piece, such as the work piece 126 in FIGS. 2, 3 and 4, may be mounted on the work platform 100 and secured to the work platform and against the backing member 114 by clamps, such as the clamp 128 which is held against the work piece by a T-bolt 130 and nut 132. Of course, the T-bolt 130 is preferably disposed in the circular T-slot 106.

In recapitulation, and referring to FIG. 2, it can be seen that reciprocation of the cutting tool 56 and assembly 14 in the direction of the arrow 64 will result in reciprocation of the rack 74 in the direction of the arrow 76 which will, in turn, result in oscillation of the work platform 100 and the work piece 126 about the axis of the spur gear 88, as indicated by the arrow 134. This relative reciprocation and oscillation will occur, of course, only if the slot 42 is disposed at an angle with respect to the direction of the arrow 64. Thus, it can be seen that the cutting tool 56, which moves rectilinearly, engages the work piece 126 which, at the same time, oscillates about an axis. This rectilinear movement of the cutting tool 56 and oscillation of the work piece 126 results in a radiused cut as indicated at 136 in FIGS. 2, 3 and 4.

The radius attachment disclosed above may be arranged to provide an accurate radiused surface or edge which is centered about a predetermined point. The radius of the cut made using my attachment depends on the amount of oscillation of the work piece while the cutting tool is engaged therewith. Thus, if the slot 42 is parallel with the direction of the arrow 64, the rack 74 will not reciprocate, the work piece 126 will not oscillate and, therefore, the cutting tool 56 will form a flat surface, i.e., a surface having a radius of infinity. On the other hand, if the slot 42 is positioned at a slight angle, say three to five degrees, the rack 74 will reciprocate a small amount and, therefore, the work piece 126 will oscillate a correspondingly small amount and the cut formed by the cutting tool will have a rather large radius. If the slot 42 is positioned at a rather large angle, say fifteen to twenty degrees, with respect to the direction of the arrow 64, the rack 74 will reciprocate a correspondingly greater amount and the work piece 126 will be oscillated through a greater arc and the cut formed by the cutting tool 56 will have a correspondingly smaller radius.

The angle between the slot 42 and the direction of the arrow 64 will, therefore, determine the radius of the cut provided by my attachment. In the following paragraphs, I have provided an illustrative method for determining the desired angle between the slot 42 and the direction of the arrow 64. I have also provided a method for locating the work piece 126 on the work platform 100 so as to establish the proper center for the radiused cut to be made.

Referring now to FIGS. 3 and 4, I will describe a method for positioning the illustrative work piece 126 on the work platform 100 so as to provide the radiused edge 136 which is centered about the point 138. Assume that the radius is represented by the letter R and, for convenience, the chord length of the radiused edge 136 is the same as the width, represented by the reference number 140, of the work piece 126. Further, assume an angle 142 between a straight line drawn between the point 143 at the edge of the surface 136 and the point 144 at the center of the edge 136 and the chord, represented by the line 145. The angle 142 then, is the angle to be provided between the slot 42 and the direction of the arrow 64. A mathematical expression for the angle 142 is set out below:

$$\text{Sine angle } 142 = R - \sqrt[2]{R^2 - (\tfrac{1}{2} \text{ chord})^2}$$

where $(\tfrac{1}{2} \text{ chord})^2$ is equal to one-half of the width 140 squared.

When the angle 142 is established between the slot 42 and the direction of the arrow 64, the cutting tool 56 will provide a cut having a radius equal to R as shown in FIG. 3. However, the work piece 126 must be correctly positioned on the work platform 100 to provide a radiused cut having the center 138 located on the line 147 (FIG. 3) which runs through the axis of the work platform 100 and perpendicular to the direction of movement of the cutting tool 56. Specifically, the backing member 114 must be positioned on the work platform 100 as shown in FIG. 3 in order properly to locate the point 138 on the line 147. That is, the backing member 114 must be pivoted about the axis of the work platform 100 to the position suggested by the dashed line drawing of the backing member 114 in FIG. 3 before the cutting begins. The angle, represented by the reference number 148, between the position of the backing member 114, as suggested by solid lines, and the position of the backing member 114, as suggested by dashed lines, must be equal to the angle 142, shown in FIG. 4. The angle 148 is easily established by well known techniques, such as the sine-bar technique discussed previously. That is, the angle 148 may be established by placing gauge blocks between the dowel pin 102 and the surface 124 of the backing member 114. Thus, by knowing the diameter of the dowel pin 102, the distance between the dowel pin 102 and the axis of the work platform 100 and the thickness of the gauge blocks, one can easily make the angle 148 equal to the angle 142. When the surface 124 is against the dowel pin 102, the surface 124 is perpendicular to the line 147.

In recapitulation, it can be seen that my radius attachment may be used to cut a given radius on a work piece, such as the work piece 126, by first determining the angle 142, adjusting the second bar 20 so that the angle between the slot 42 and the direction of the arrow 64 is equal to the angle 142, pivotally adjusting the backing member 114 about the axis of the work platform 100 by an amount equal to the angle 142 and then placing the work piece 126 on the work platform 100 and against the surface 124 of the backing member 114.

I have constructed a radius attachment in accordance with the above-disclosure and have made radiused cuts using the attachment and the method just described. The radiused cuts so obtained were checked on a jig bore having an accuracy of at least one ten thousandth (.0001) of an inch and were found to have the desired radius.

As a matter of convenience in calculating the desired angle between the first bar 18 and the second bar 20, the spur gear 88 of my constructed attachment has a five inch pitch diameter with sixty teeth and the distance between the pin 40 and the pivot axis 22 is also five inches.

I claim as my invention:

1. A radius attachment for a machine of the type having a bed and a tool arranged for relative, rectilinear reciprocation, said attachment comprising an assembly, means for rigidly connecting said assembly to said tool, said assembly comprising a member providing a substantially rectilinear guide disposed at a predetermined angle relative to the direction of said reciprocation, a spur gear journalled for oscillation on said bed, a work platform journalled for oscillation on said bed about a common axis with said spur gear, said work platform being connected to said spur gear so as to oscillate therewith, a rack drivingly engaged with said spur gear and arranged for reciprocation relative to the axis thereof, follower means engaged with said guide, said follower means being connected to said rack so as to reciprocate said rack when said first mentioned reciprocation occurs, the stroke of said rack being determined by the value of said predetermined angle.

2. A radius attachment as in claim 1 wherein said member is a sine-bar having one of its ends pivotally connected to said assembly, and wherein means are provided for adjustably holding the opposite end of said sine-bar in a spaced relationship with said assembly, thereby establishing a value for said predetermined angle.

3. A radius attachment as in claim 1 wherein said guide is a longitudinally extending slot provided in said member, wherein said follower means is a roller guidingly received in said slot, and wherein said roller is journalled on one end of said rack.

4. A radius attachment as in claim 1 wherein said rack is also guided for reciprocation in a direction substantially perpendicular to the direction of said first mentioned reciprocation.

5. A radius attachment as in claim 1 including a backing member mounted on said work platform, said backing member having a surface defining a plane, and means for mounting said backing member on said work platform so as to have said plane include said common axis and be adjustably rockable therearound.

6. A radius attachment as in claim 5 including means for adjustably positioning said backing member about said axis so that said plane is at said predetermined angle from the direction of said first mentioned reciprocation.

7. A radius attachment for a machine of the type having a bed and a cutting tool arranged for relative, rectilinear reciprocation, said radius attachment comprising a base having a guideway provided therein, said guideway extending in the direction of said rectlinear reciprocation, a rack mounted for reciprocation on said base in a direction substantially perpendicular to said guideway, an assembly adapted for reciprocation in said guideway, said assembly including a member having an elongated, rectilinear slot provided therein, said slot being disposed at a predetermined angle relative to the direction of said guideway, means for providing a driving connection between said rack and said member comprising an element guidingly received in said slot, said element being carried by one end of said rack, a spur gear journalled on said base and engaged with said rack, a work platform journalled on said base on a common axis with said spur gear, means drivingly connecting said work platform to said spur gear, means for rigidly mounting said base on said bed and means for rigidly connecting said assembly to said cutting tool.

8. A radius attachment as in claim 7 wherein said common axis is substantially perpendicular to said direction of reciprocation of said rack and to said guideway.

9. A radius attachment as in claim 8 including a backing member having a work engaging surface defining a plane, means for mounting said backing member on said work platform so as to have said plane include said common axis and be rockable therearound, and at least one cylindrical pin spaced a predetermined distance from said common axis and fixed to said platform member so as to be parallel with said common axis, said pin being arranged so that the distance from said plane to the side surface of said pin, along a line running through the center of said pin and perpendicular to said plane, divided by the distance between the intersection of said line with the surface of said pin and said common axis is equal to the sine of said predetermined angle.

10. A radius attachment for a machine of the type having a bed and a tool arranged for relative rectilinear reciprocation comprising a wedge fixedly connected to said tool, said wedge having a selectively adjustable wedge angle, an element journalled for oscillation on said bed, a second element drivingly engaged with said first mentioned element, said second element being drivingly engaged with said wedge so as to reciprocate substantially transversely to and substantially rectilinearly relative to the axis of oscillation of said first mentioned element in proportional response to relative reciprocation between said bed and said tool, and a work platform carried for oscillation by said first mentioned element.

References Cited

UNITED STATES PATENTS

| | | | |
|---|---|---|---|
| 1,572,978 | 2/1926 | Watson | 90—38 X |
| 2,590,042 | 3/1952 | Root | 90—24.3 X |

ANDREW R. JUHASZ, *Primary Examiner.*

G. WEIDENFELD, *Assistant Examiner.*